(12) United States Patent
Sase et al.

(10) Patent No.: US 7,630,113 B2
(45) Date of Patent: Dec. 8, 2009

(54) MICROSCOPE OPTICAL SYSTEM, MICROSCOPE, AND VIRTUAL SLIDE FORMING SYSTEM

(75) Inventors: Ichiro Sase, Kanagawa (JP); Katsuya Watanabe, Kanagawa (JP)

(73) Assignee: Nikon Corporation, Tokyo (JP)

( * ) Notice: Subject to any disclaimer, the term of this patent is extended or adjusted under 35 U.S.C. 154(b) by 72 days.

(21) Appl. No.: 11/121,961

(22) Filed: May 5, 2005

(65) Prior Publication Data

US 2005/0248837 A1 Nov. 10, 2005

(30) Foreign Application Priority Data

May 10, 2004 (JP) ............... 2004-140264

(51) Int. Cl.
*G02B 26/08* (2006.01)
(52) U.S. Cl. ................. 359/212.1; 359/380
(58) Field of Classification Search ........... 359/368, 359/380, 214, 215
See application file for complete search history.

(56) References Cited

U.S. PATENT DOCUMENTS

| | | | | |
|---|---|---|---|---|
| 3,518,014 A | * | 6/1970 | Weber | ............ 356/629 |
| 6,028,306 A | * | 2/2000 | Hayashi | ............ 250/235 |
| 6,272,235 B1 | * | 8/2001 | Bacus et al. | ............ 382/133 |
| 6,313,452 B1 | * | 11/2001 | Paragano et al. | ...... 250/201.3 |
| 6,456,430 B1 | | 9/2002 | Kasahara et al. | ............ 359/380 |
| 6,771,310 B1 | | 8/2004 | Torita et al. | ............ 348/219.1 |
| 6,945,930 B2 | * | 9/2005 | Yokota | ............ 600/118 |
| 7,233,340 B2 | * | 6/2007 | Hughes et al. | ............ 345/629 |
| 2003/0021017 A1 | * | 1/2003 | Eijsackers et al. | ........ 359/368 |
| 2005/0243412 A1 | * | 11/2005 | Bellouard et al. | ........ 359/368 |

FOREIGN PATENT DOCUMENTS

| | | | |
|---|---|---|---|
| DE | 2908334 | * | 10/1979 |
| JP | 2002-031758 | | 1/2002 |
| WO | WO 2004025331 A2 | * | 3/2004 |

* cited by examiner

*Primary Examiner*—Stephone B Allen
*Assistant Examiner*—Derek S Chapel
(74) *Attorney, Agent, or Firm*—Miles & Stockbridge P.C.

(57) ABSTRACT

An observation field of view of a microscope can be moved without moving or changing an objective lens and without varying position or state of a sample. A microscope optical system has a mirror that changes the direction of the optical path by reflection. The mirror is located in the optical path between an objective lens of the microscope and an image to be observed. The mirror can be tilted to change the position of a reflecting surface of the mirror. Accordingly, the observation field of view is moved by tilting the mirror without changing a positional relation between the objective lens of the microscope and the sample.

6 Claims, 12 Drawing Sheets

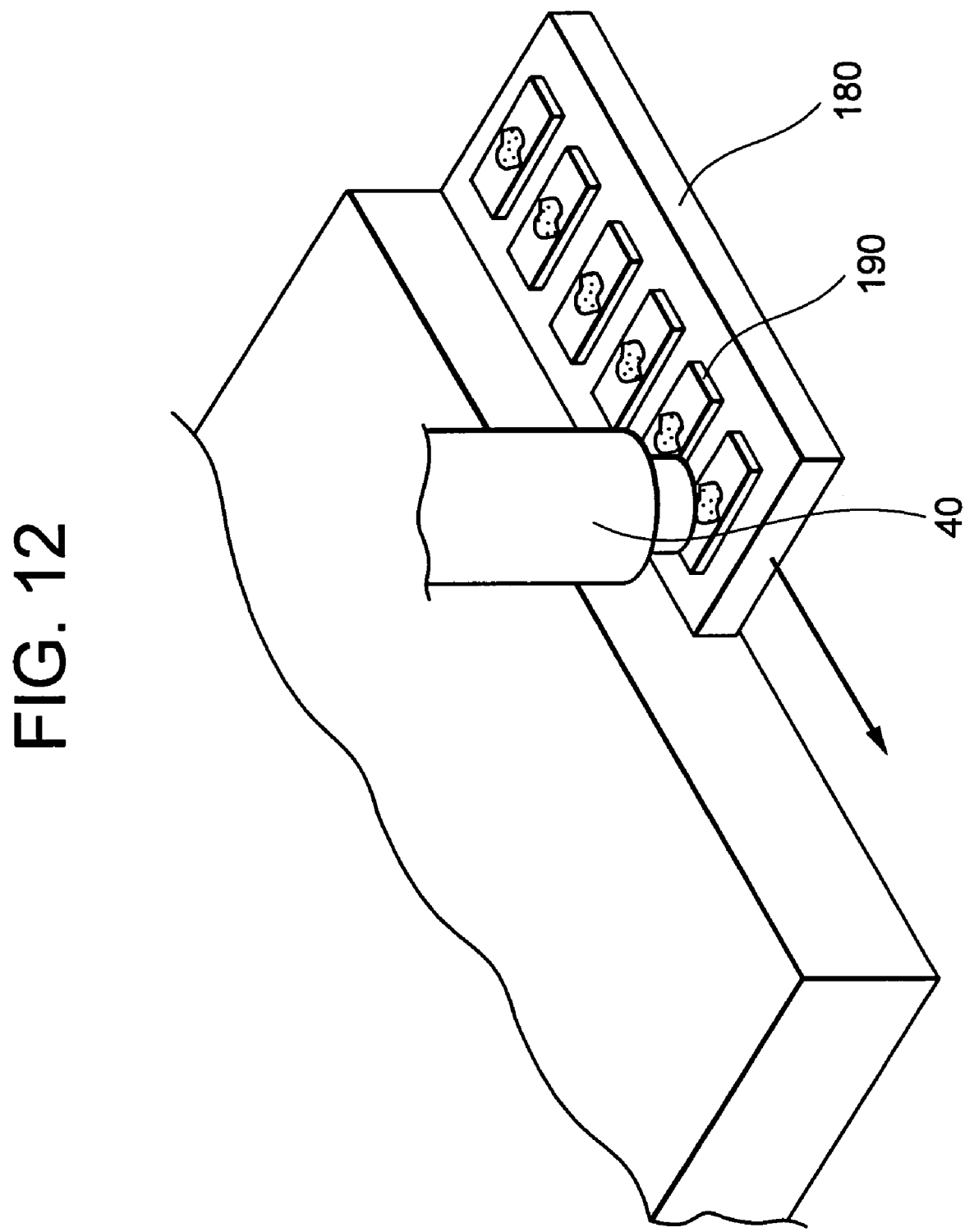

MICROSCOPE OPTICAL SYSTEM, MICROSCOPE, AND VIRTUAL SLIDE FORMING SYSTEM

The disclosure of the following priority application is herein incorporated by reference:

Japanese Patent Application No. 2004-140264 filed on May 10, 2004.

BACKGROUND OF THE INVENTION

1. Field of the Invention

The present invention relates to a microscope and an optical system thereof and a virtual slide forming system and in particular to a technique for moving an observing field of view in a microscope.

2. Related Background Art

In ordinary microscope observation, after searching for a point to be observed with an objective lens having low magnification, the point is observed with enlarging by an objective lens having high magnification. However, there is a possibility of danger that a position of a sample is slipped out by an impact upon changing an objective lens.

In an example disclosed in Japanese Patent Application Laid-Open No. 2002-31758, in order to observe a wide area, the magnification of the objective lens is limited to 32 or less and to observe details with high magnification, the numerical aperture of the objective lens is set to 0.85 or more. And the objective lens and a magnification-change optical system is combined. Accordingly, without changing the objective lens, it becomes possible to observe a wide field of view by setting low magnification to the magnification-change optical system and a fine detail with high resolving power by setting high magnification to the magnification-change optical system.

However, in the method disclosed in Japanese Patent Application Laid-Open No. 2002-31758, the same position of a sample always comes to the center of the observing image whenever changing the objective lens. Accordingly, in a low magnification observation, when you find a position, which you feel like to observe with enlarging, locating away from the center of the field of view, in order to observe with high magnification, you have to bring the position near to the optical axis of the objective lens. Accordingly, the positional relation between the sample and the objective lens has to be changed, in other words, the observing field of view has to be moved.

In an ordinary upright microscope, when an observing field of view is to be moved, it has been carried out that the observer moves a stage on which the sample is placed perpendicularly to the optical axis of the objective lens or moves the objective lens.

However, in a microscope observation in a field such as electrophysiology, it may be happened that a manipulator or the like is set to a sample, so that great care has to be taken that the manipulator does not touch with the objective lens upon moving the observation field of view. Moreover, it also has to be careful that the objective lens does not touch with a tube or a channel arranged for maintaining the environment of the sample.

In an actual experiment system, the distance between the tip of the objective lens and the manipulator is extremely small (1 mm or less), so that it has been very difficult to observe without touching with each other. Moreover, when observing with an immersion-objective lens, it may happen that the interface between the objective lens and the water, being in the state of contact with each other, makes a change by moving the field of view. In this case, when the sample is vulnerable to the vibration, there is a possibility of danger that the state of contact between an electrode needle set on the tip of the manipulator and the sample or the sample itself is changed.

Accordingly, it has been demanded to provide a method to move the observation field of view without moving or changing the objective lens or without changing the position of the stage or the sample.

SUMMARY OF THE INVENTION

The present invention is made in view of the aforementioned problems and has an object to provide a technique capable of moving an observation field of view of a microscope without changing the position or the state of a sample and a stage and without moving or changing of an objective lens.

According to a first aspect of the present invention, a microscope optical system includes a first objective lens and a second objective lens. The first objective lens locates at the most sample side in an optical path between a sample and an image to be observed. The second objective lens forms an intermediate image conjugate with the sample together with the first objective lens. The microscope optical system according to the first aspect of the present invention has special features described below. Firstly, a mirror that changes the direction of the optical path by reflection and locates in the optical path between the first objective lens and the second objective lens is included. Secondly, the mirror can be tilted with changing the position of a reflecting surface of the mirror.

In the microscope optical system according to the first aspect of the present invention, it is preferable that a variable magnification optical system capable of changing magnification of the image to be observed is included between the mirror and the image to be observed.

In the microscope optical system according to the first aspect of the present invention, the microscope optical system preferably includes a controller that has information showing relations between a position of an observation field of view corresponding to the sample and an amount of tilt of the mirror and tilts the mirror on the basis of the information.

A microscope according to a second aspect of the present invention has the microscope optical system according to the first aspect of the present invention.

A third aspect of the present invention provides a virtual slide forming system including the microscope according to the second aspect, an image data generator and an image synthesizer. The image data generator repeatedly carries out in the microscope a movement that tilts the tilt mirror and a movement that photographs the image to be observed and generates image data. The image synthesizer synthesizes a plurality of the generated image data and forms virtual slides of the sample.

According to a fourth aspect of the present invention, a microscope optical system including a first objective lens, and a second objective lens is provided. The first objective lens locates at the most sample side in an optical path between a sample and an image to be observed. The second objective lens forms an intermediate image conjugate with the sample together with the first objective lens. The microscope optical system according to the fourth aspect of the present invention includes a lens that locates in the optical path behind the intermediate image and is movable in the direction perpendicular to the optical axis.

A fifth aspect of the present invention provides a microscope equipped with the microscope optical system according to the fourth aspect of the present invention.

A sixth aspect of the present invention provides a virtual slide forming system that includes the microscope according to the fifth aspect of the present invention, an image data generator, and an image synthesizer. The image data generator repeatedly carries out in the microscope a movement that moves the lens in a direction perpendicular to the optical axis and a movement that photographs the image to be observed and generates image data. The image synthesizer synthesizes a plurality of the generated image data and forms virtual slides of the sample.

A seventh aspect of the present invention provides a microscope optical system including a first objective lens, a mirror, and a second objective lens. The first objective lens locates at a sample side in an optical path between a sample and an image to be observed. The mirror locates to an image side of the first objective lens. The second objective lens locates to the image side of the mirror and forms an intermediate image conjugate with the sample. The mirror is arranged to be able to be tilted such that the intermediate image is moved in the direction substantially perpendicularly to the optical axis.

In the microscope optical system according to the seventh aspect of the present invention, the microscope optical system preferably includes a controller that has information showing relations between a position of an observation field of view corresponding to the sample and an amount of tilt of the mirror and tilts the mirror on the basis of the information.

An eighth aspect of the present invention provides a microscope including the microscope optical system according to the seventh aspect of the present invention.

A ninth aspect of the present invention provides a virtual slide forming system including the microscope according to the eighth aspect of the present invention, an image data generator and an image synthesizer. The image data generator repeatedly carries out in the microscope a movement that tilts the tilt mirror and a movement that photographs the image to be observed and generates image data. The image synthesizer synthesizes a plurality of the generated image data and forms virtual slides of the sample.

Other features and advantages according to the present invention will be readily under stood from the detailed description of the preferred embodiments in conjunction with the accompanying drawings.

BRIEF DESCRIPTION OF THE DRAWINGS

FIG. 12 is a perspective view showing a large stage of the microscope shown in FIG. 11 in detail.

DESCRIPTION OF THE PREFERRED EMBODIMENTS

Each embodiment according to the present invention is explained below with reference to accompanying drawings. In each drawing, the same reference symbol is attached to the same element so as to omit duplicated explanation.

First Embodiment

Figure 1:
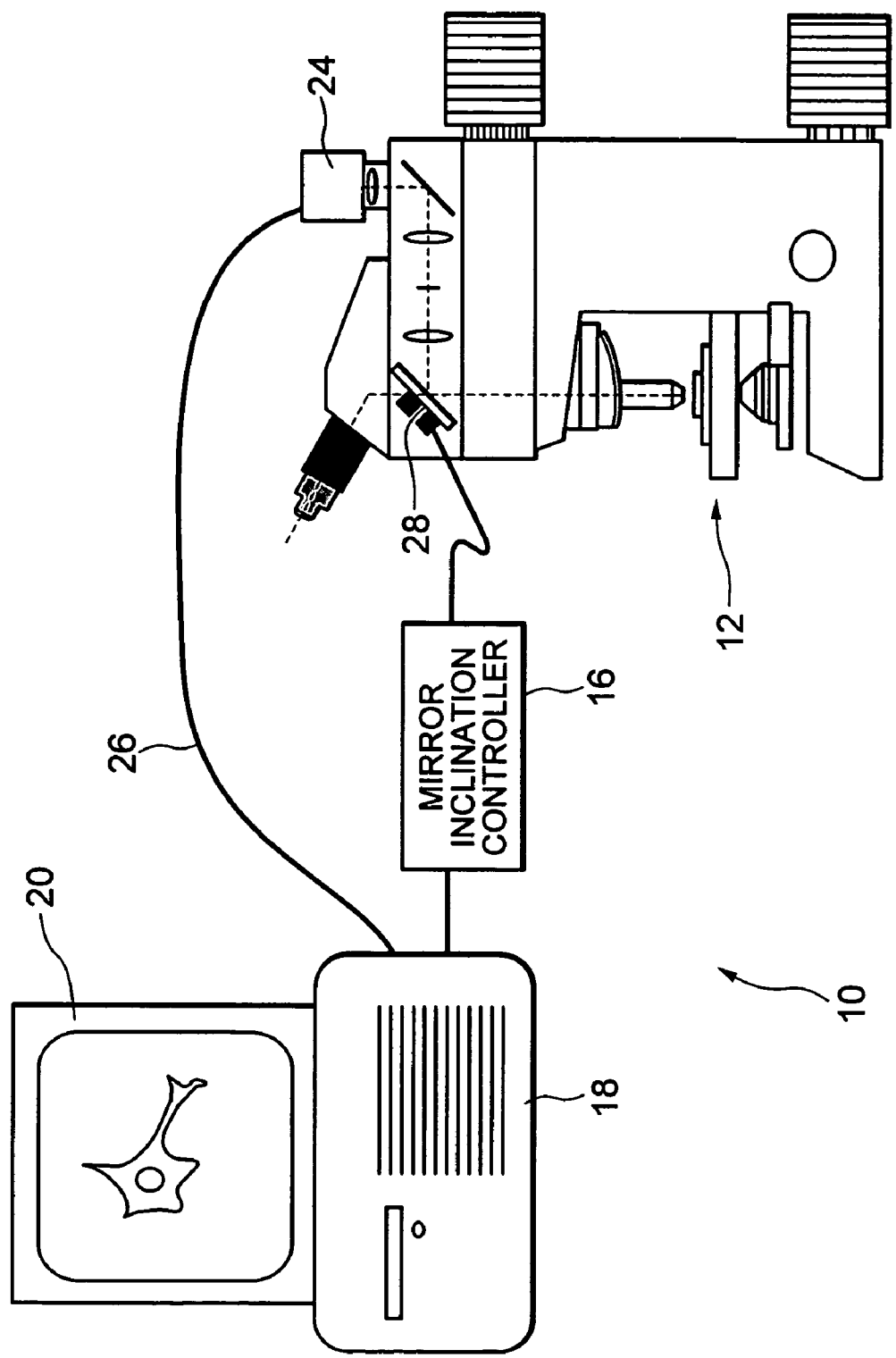
FIG. 1 is a schematic diagram showing a microscope system according to a first embodiment of the present invention.

FIG. 1 is a schematic diagram showing a microscope system according to a first embodiment of the present invention. As shown in FIG. 1, the microscope system 10 has a microscope 12, a mirror inclination controller 16, a computer 18, and a monitor 20. The computer 18 obtains an image signal from a camera 24 of the microscope 12 through a cable 26 and displays an enlarged image of a sample on the monitor 20.

Figure 2:
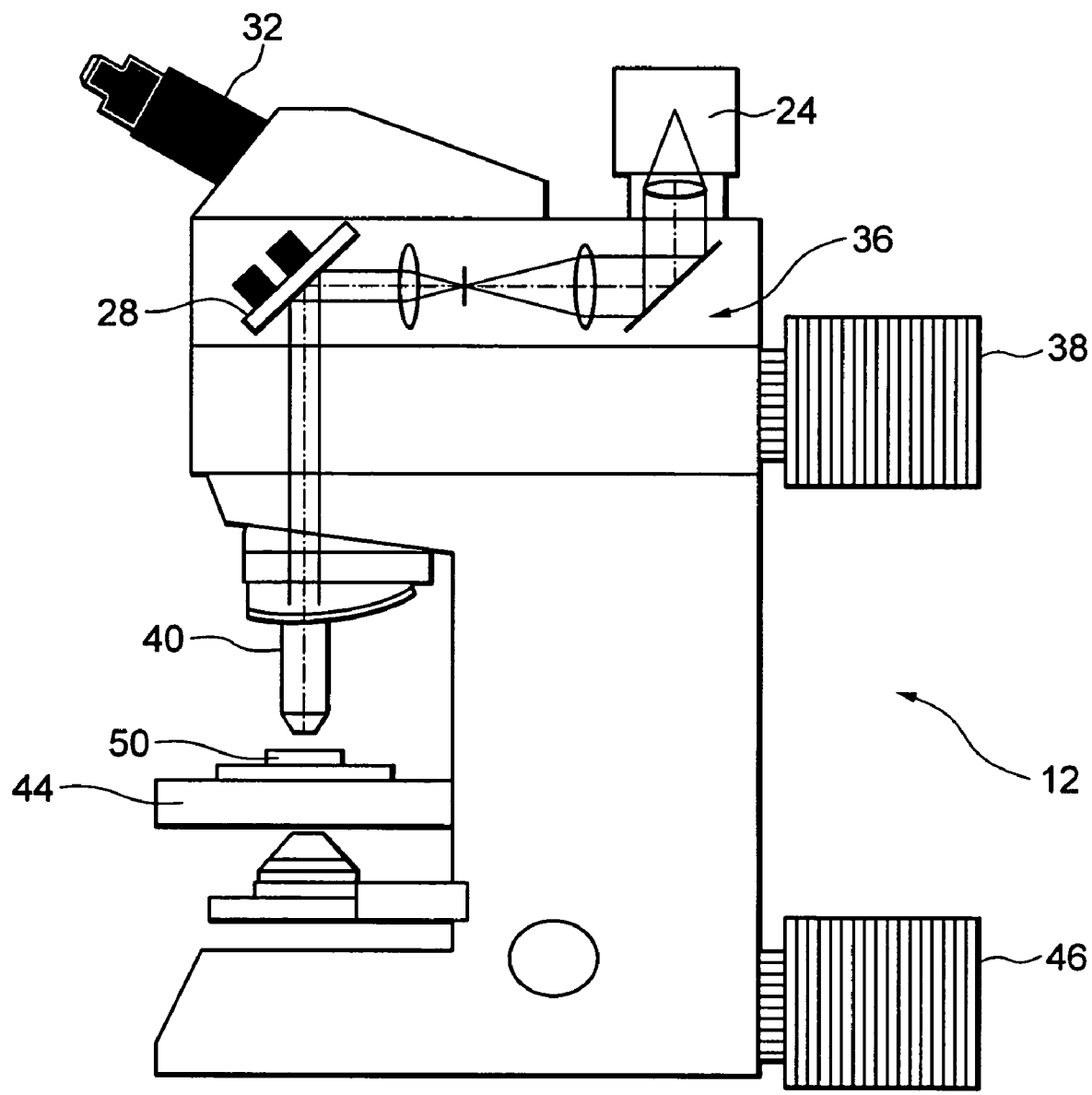
FIG. 2 is a schematic diagram showing the microscope of FIG. 1 in detail.

FIG. 2 is a schematic diagram showing the microscope 12 of FIG. 1 in detail. As shown in FIG. 2, the microscope 12 has a tilt mirror 28, an eyepiece portion 32, the camera 24, a variable magnification optical system 36, a fluorescence excitation light source 38, an objective lens 40, a stage 44, and a transmitted illumination light source 46.

The tilt mirror 28 is a semi-transparent mirror or a dichroic mirror. Accordingly, a bundle of light transmitting through the tilt mirror 28 is formed an observing image by an optical system (not shown because of publicly known elements) such as an eyepiece in the eyepiece portion 32. Incidentally, when the system does not have the eyepiece portion 32, the tilt mirror 28 may be a total reflection mirror. The fluorescence excitation light source 38 illuminates a sample 50 on the stage 44 downward (epi-illumination) through such as lenses and mirrors (not shown). The transmitted illumination light source 46 illuminates a sample 50 on the stage 44 upward through such as lenses and mirrors (not shown).

The objective lens 40 according to the first embodiment of the present invention has a magnification of 16 and a numerical aperture of 0.8 and makes it possible to observe a wide field of view. The objective lens 40 has, in order from the sample 50 side, a first lens group, a second lens group, and a third lens group (not shown). The first lens group includes a meniscus lens having a concave surface facing to the sample 50 side and has positive refractive power as a whole. The second lens group includes at least two three-piece cemented lenses. The third lens group includes a first cemented meniscus lens having a concave surface facing to an image side, and a second cemented meniscus lens having a concave surface facing to the sample 50 side and facing to the concave surface of the first cemented meniscus lens.

The objective lens 40 according to the first embodiment of the present invention satisfies the following conditional expressions (1) through (4):

$$0.23 < d0/F < 0.35 \quad (1)$$

$$1 < f1/F < 2 \quad (2)$$

$$0.7 < r3g/F < 1.0 \quad (3)$$

$$1.6 < n3g < 1.75 \quad (4)$$

where d0 denotes a distance along the optical axis between the sample plane and the most sample 50 side surface of the objective lens 40, F denotes the focal length of the objective lens 40, f1 denotes the focal length of the first lens group, r3g denotes a radius of curvature of the concave surface of the first cemented meniscus lens in the third lens group, and n3g denotes refractive index at d-line (wavelength $\lambda$=587.6 nm) of the image side lens composing the first cemented lens in the third lens group.

When the ratio d0/F is equal to or exceeds the upper limit of conditional expression (1), the bundle of light extends largely, so that it becomes difficult to make the numerical aperture large. On the other hand, when the ratio d0/F is equal to or falls below the lower limit of conditional expression (1), it becomes difficult to secure sufficient working distance. When the ratio f1/F is equal to or exceeds the upper limit of conditional expression (2), refractive power of the first lens group becomes weak, so that it becomes difficult to bring the bundle of light sufficiently near to parallel. On the other hand, when the ratio f1/F is equal to or falls below the lower limit of conditional expression (2), spherical aberration and coma become worse. When the ratio r3g/F is equal to or exceeds the upper limit of conditional expression (3), sufficient effect for correcting Petzval sum cannot be obtained, so that flatness of the image plane is deteriorated by curvature of field and astigmatism. On the other hand, when the ratio r3g/F is equal to or falls below the lower limit of conditional expression (3), the radius of curvature becomes too small, so that correction of coma and the like is affected. When the value n3g is equal to or exceeds the upper limit of conditional expression (4), transmittance of the light in short wavelength range becomes low. On the other hand, when the value n3g is equal to or falls below the lower limit of conditional expression (4), it becomes difficult to correct spherical aberration and coma.

Figure 3:
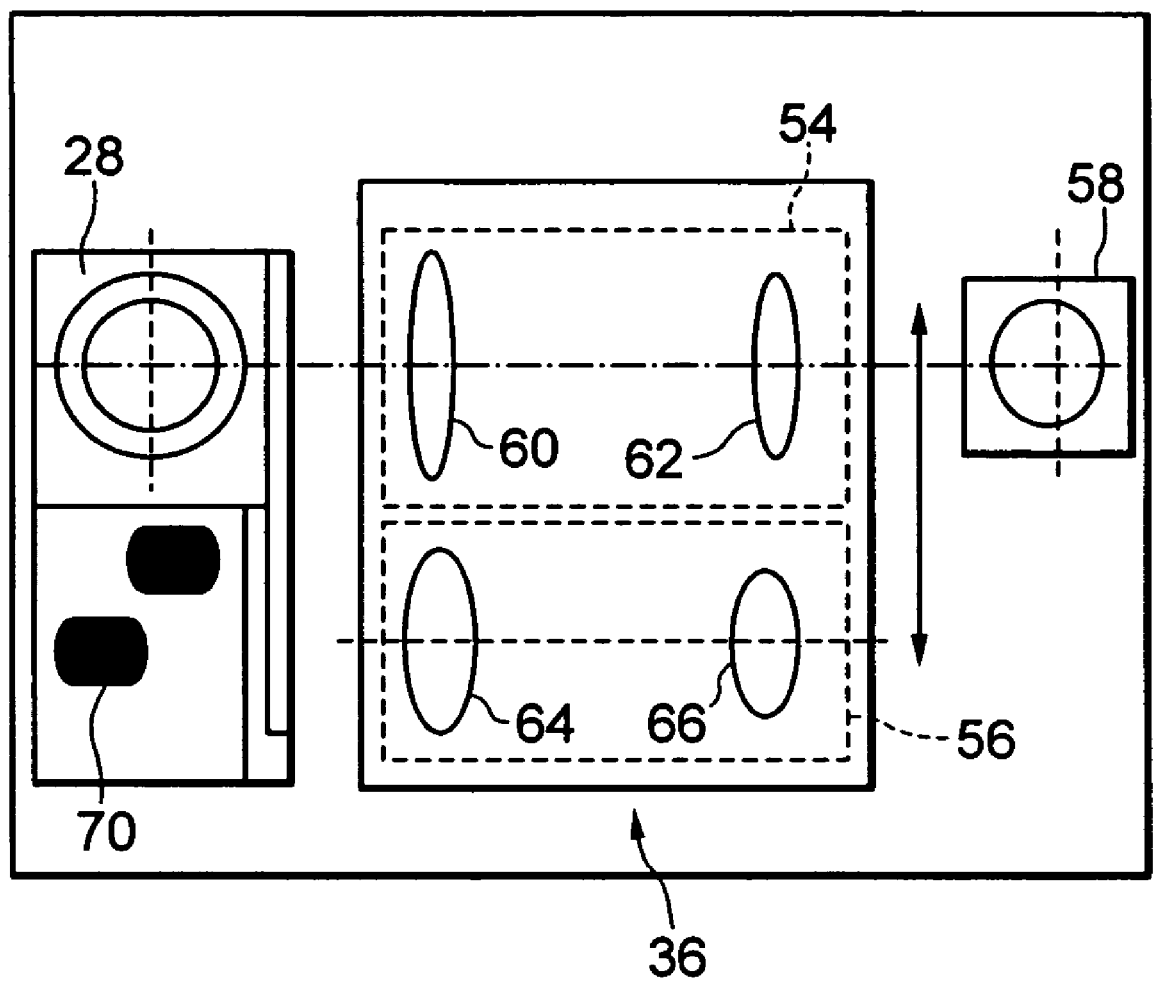
FIG. 3 is a schematic plan view of a variable magnification optical system in detail seen along the optical axis of the objective lens shown in FIG. 2 in the direction from an eyepiece portion to a sample.

FIG. 3 is a schematic plan view of a variable magnification optical system 36 of the microscope 12 in detail seen along the optical axis of the objective lens 40 shown in FIG. 2 in the direction from an eyepiece portion 32 to the sample 50. As shown in FIG. 3, the variable magnification optical system 36 includes a low magnification optical system 54, a high magnification optical system 56, and a mirror 58. The low magnification optical system 54 includes variable magnification lenses 60 and 62 and has a magnification of 0.35. The high magnification optical system 56 includes variable magnification lenses 64 and 66 and has a magnification of 4.

In other words, when either the low magnification optical system 54 or the high magnification optical system 56 is inserted on the optical path between the tilt mirror 28 and the camera 24, the magnification of the observing image projected on the camera 24 can be changed. Accordingly, the magnification of the observing image is determined by the product of the magnification (16) of the objective lens 40 multiplied by that of the variable magnification optical system 36, and, in this embodiment, is 5.6 and 64.

Figure 4:
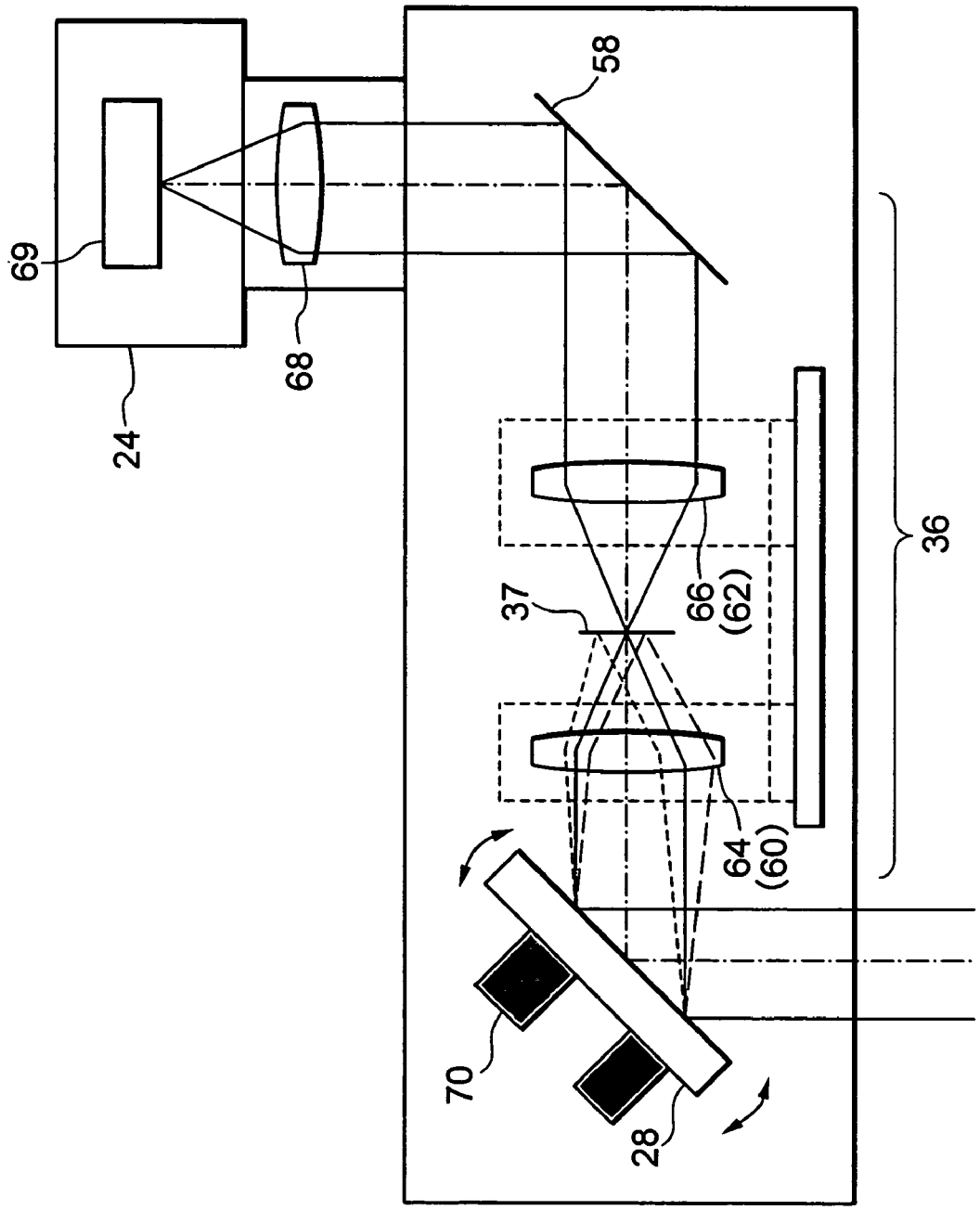
FIG. 4 is a diagram explaining the optical path of a bundle of light come out from the objective lens forming an image in an observation camera through the variable magnification optical system according to the first embodiment.

FIG. 4 is a diagram explaining the optical path of a bundle of light come out from the objective lens 40 forming an image in the camera 24 through the variable magnification optical system 36 according to the first embodiment. The principle of moving method of the observation field of view in the microscope system 10 is explained below with reference to FIG. 4.

A bundle of light from the sample 50, after passing the objective lens 40, is reflected by the tilt mirror 28 changing the direction of the optical path, and is incident to the variable magnification optical system 36. After passing the variable magnification lens 64 (or 60), the bundle of light forms an intermediate image 37, after passing through the variable magnification lens 66 (or 62), changes the optical path perpendicularly by the mirror 58, and is incident to an imaging lens 68 in the camera 24. By the imaging lens 68, an enlarged image of the sample 50 is formed on the imaging plane of an imaging device 69 in the camera 24. The camera 24 carries out publicly known processing and the like to the image signal output from the imaging device 69 and generates image data. The image data is input to the computer 18 through the cable 26. By the way, the image processing and the like may be carried out by the computer 18 other than by the camera 24. By the way, a field stop may be arranged in the vicinity of the intermediate image 37.

In the first embodiment, the mirror inclination controller 16 shown in FIG. 1 controls a tilt controller 70 on the tilt mirror 28 to tilt the tilt mirror 28 in response to the instruction from the computer 18. The tilt in this case means such that the existing position of the reflection surface of the tilt mirror 28 changes by the tilt, and does not mean that the reflection surface is rotated in the same plane around the normal to the reflection surface.

By the way, the position and the inclination of the mirror 58 shown in FIG. 4 are fixed. The angle between the reflection surface of the mirror 58 and the optical axis of the variable magnification optical system 36 is 45 degrees. In the first embodiment, even if the variable magnification optical system 36 is changed to either the low magnification optical system or the high magnification optical system shown by an arrow in FIG. 3, the position of the optical axis is not changed. In the microscope according to the first embodiment, optical arrangement changes only when the tilt mirror 28 is tilted.

The tilt mirror 28 has two axes of tilt both of which are located on the reflection surface of the tilt mirror 28. By the way, the both axes are imaginary axes, it means that the tilt mirror 28 tilts around the imaginary axis, and not that a shaft like a stick or bar is installed. In order to define the direction of the axis of tilt of the tilt mirror 28, a normal state where the reflection surface of the tilt mirror 28 is parallel to that of the mirror 58 is assumed. In the normal state, the bundle of light come out from the objective lens 40 changes the optical path perpendicularly by the tilt mirror 28.

In the normal state, one of the axes of the tilt mirror 28 is perpendicular to both the axis of the objective lens 40 and that of the variable magnification lens 64 and 66 (or 60 and 62), in other words, in the direction perpendicular to the plane of FIG. 4. Hereinafter, the axis is called as an X axis. The other tilt axis of the tilt mirror 28 crosses the X axis at right angles on the reflection surface of the tilt mirror 28 and is hereinafter called as a Y axis. The cross point of the X axis and the Y axis is located at the center of the reflection surface of the tilt mirror 28 and the tilt mirror 28 is tilted without changing the position of the cross point.

When the tilt mirror 28 is tilted, the intermediate image 37 formed by the objective lens 40 and the variable magnification lens 64 (or 60) moves in the same plane perpendicular to the optical axis of the variable magnification optical system 36. Accordingly, the bundle of light incident to the variable magnification lens 66 (or 62) located behind the intermediate image 37 on the optical path moves in the direction perpendicular to the optical axis of the variable magnification optical system 36. This is equivalent to the case that the stage 44 on which the sample 50 is placed is moved perpendicularly to the optical axis of the objective lens 40. In other words, a user can move the observation field of view displayed on the monitor 20 by tilting the tilt mirror 28 with input operation to the computer 18. Incidentally, the direction of the bundle of the light passing through the tilt mirror 28 does not change in spite of tilting the tilt mirror 28, so that the same image is observed by the eyepiece portion 32.

Figure 5:
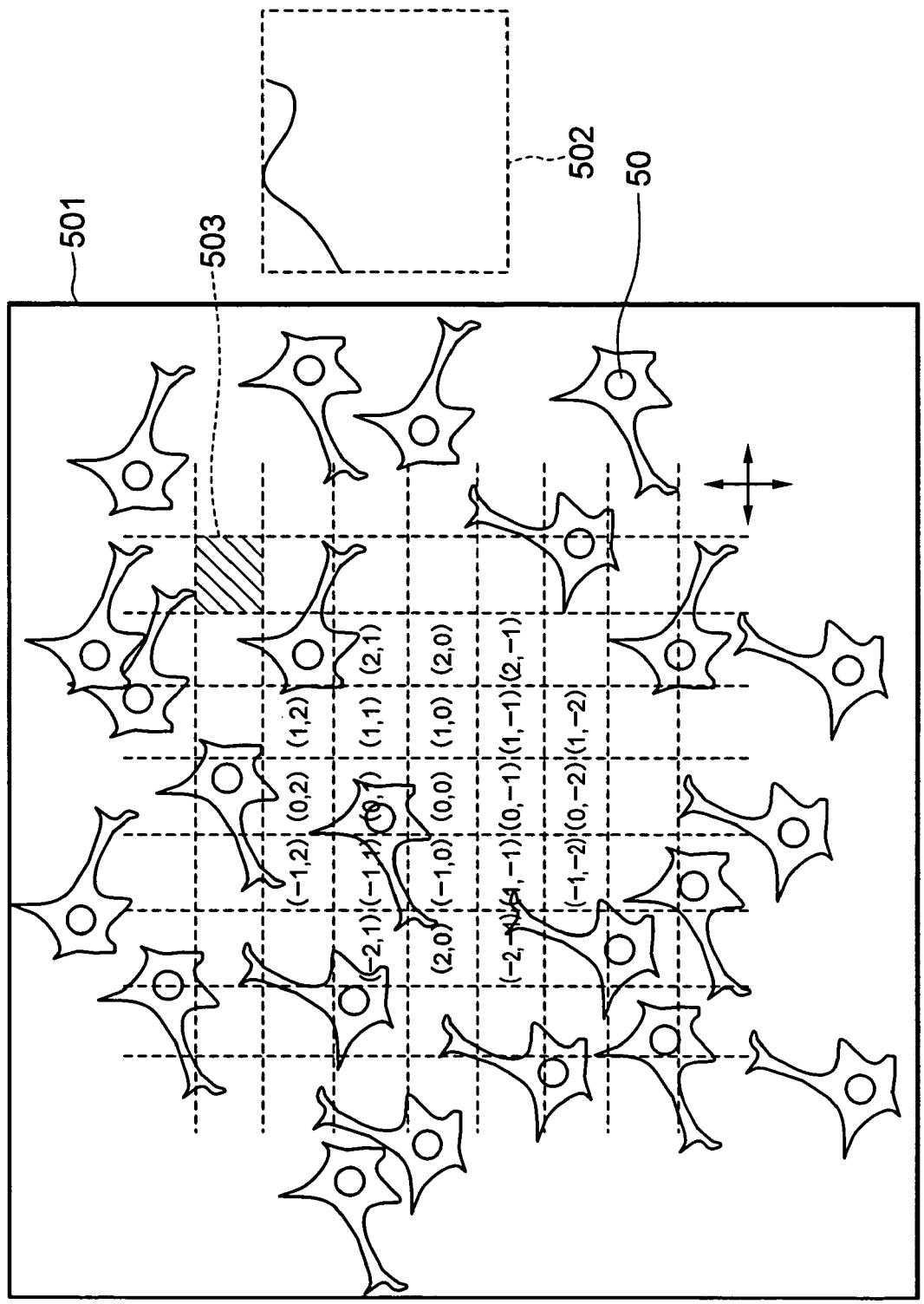
FIG. 5 is a diagram explaining a relation of observation fields of view between with low magnification and with high magnification.

FIG. 5 is a diagram explaining a relation of observation fields of view between with low magnification 501 and with high magnification 502. The specific method for moving the observation field of view is explained below with reference to FIG. 5. In the first embodiment of the present invention, for the purpose of simplify the explanation, it is explained with assuming that the movement of the observation field by tilting the tilt mirror 28 is not carried out upon observing with low magnification. In other words, it is explained the case that after searching for a position to be observed with low magnification observation, by changing the variable magnification optical system 36 to high magnification, the enlarged position is observed with controlling the tilt mirror 28.

As shown in FIG. 5, in the observation with low magnification 501, the block separation (dotted lines) of the field of view and the coordinates of the field of view are superimposed on an observing image on the monitor 20 and each block is assumed to be a unit block field of view 503. By the way, it is possible that only the observing image is simply displayed. In FIG. 5, the coordinates and the dotted lines of the block field of view are shown only a portion to avoid complication.

In order to specifically explain the amount of tilt (tilt angle) of the tilt mirror 28, which becomes important information in moving the observation field of view, optical value of each element is shown as an example. The aspect ratio of the picture on the monitor 20 of the horizontal direction (right and left in FIG. 5) to the vertical direction (up and down in FIG. 5), in other words, the aspect ratio of the imaging device 69 is 4:3. The diagonal dimension of the imaging device 69 is a two-third inch.

Accordingly, when the variable magnification optical system 36 is low magnification, the total magnification of the microscope 12 is 5.6, so that the diameter of about 1.6 mm on the sample 50 becomes the observation field of view. When the variable magnification optical system 36 is high magnification, the total magnification of the microscope 12 is 64, so that the diameter of about 130 μm on the sample 50 becomes the observation field of view.

In order to simplify the explanation, the imaging device 69 and the like are assumed to be arranged such that when the tilt mirror 28 is tilted around the X axis, the field of view moves only up or down, and when the tilt mirror 28 is tilted around the Y axis, the field of view moves only right or left. Moreover, when the variable magnification optical system 36 is changed to high magnification without tilting the tilt mirror 28, the block field of view of the coordinates (0, 0) locating at the center of the observing image in the low magnification is assumed to be the standard block. The observing image of the standard block with high magnification is shown by 502 in FIG. 5 on the right side.

In order to observe enlarged image of a block adjacent upward or downward to the standard block, in other words, the block (0, 1) or (0, −1), the tilt mirror 28 may be tilted by about 0.297° around the X axis and the variable magnification optical system 36 may be changed to the high magnification.

In order to move to the block field of view of two blocks upward, the tilt amount may be 0.594° and in order to move to the block field of view of n-blocks upward (or downward), the tilt amount may be n×0.297°.

In order to observe enlarged image of a block adjacent right or left to the standard block, in other words, the block (−1, 0) or (1, 0), the tilt mirror 28 may be tilted by about 0.321° around the Y axis and the variable magnification optical system 36 may be changed to the high magnification. In order to move to the block field of view of n-blocks right (or left), the tilt amount may be n×0.321°. The above-described tilt amount can be controlled by constructing the tilt controller 70 by a micro-actuator, a linear actuator with an encoder, or the like. By the way, the operation for moving the field of view may be carried out after changing the variable magnification optical system 36 to high magnification.

The computer 18 stores the table data showing that how much amount should the tilt mirror 28 be tilted around the X axis and the Y axis in order to observe each block field of view in the observation picture of low magnification with high magnification. A portion of the table data is, for example, shown below.

Coordinates (0, 0): [θx (0, 0), θy (0, 0)]
Coordinates (0, 1): [θx (0, 1), θy (0, 1)]
Coordinates (1, 1): [θx (1, 1), θy (1, 1)]

As shown in the first embodiment, when the tilt mirror 28 is set to the standard state upon observing with low magnification, θx (0, 0) and θy (0, 0) are both 0°. In this case, θx (0, 1) is 0°, θy (0, 1) is 0.321°, θx (1, 0) is 0.297°, and θy (1, 0) is 0°. Accordingly, when a block field of view is selected by inputting with a keyboard, the computer 18 derives the tilt amount of the tilt mirror 28 to move to the selected block field of view in accordance with the table data. The computer 18 instructs the mirror inclination controller 16 to tilt the tilt mirror 28 by the derived tilt amount. The mirror inclination controller 16 controls the tilt controller 70 to tilt the tilt mirror 28. Then, the variable magnification optical system 36 is changed to high magnification by a publicly known mechanism in response to the instruction by the computer 18.

When the tilt amount of the tilt mirror 28 becomes large, it may happen that the relation between the moving amount of the observing field of view and the tilt amount of the tilt mirror 28 is not linear. In this case, when the field of view is simply moved by a multiple of the each moving amount of a unit block field of view, a distorted quadrangle field of view on the sample 50 is observed as an area of a rectangular shape in the image plane. Accordingly, each moving amount in the table data according to the first embodiment is a value corrected the distortion, so that there is some difference from the value corresponding to a multiple of the moving amount of each block field of view. By correcting distortion as described above, always a rectangular area on the sample 50 can be observed. The tilt amount corrected the distortion can be calculated from experiments, simulations, or the like in advance.

In this manner, the first embodiment makes it possible to move the observation field of view by only changing the amount of tilt of the tilt mirror 28 inserted into the collimated optical path between the objective lens 40 and the imaging lens 68. In other words, moving the observation field of view does not require a change or a move of the objective lens 40 or a move of the stage 44. Accordingly, an inevitable problem of the prior art that the positional relation between the objective lens and the sample has to be changed upon moving the observation field of view has been solved.

Moreover, even if a needle of a micromanipulator is there in the vicinity of the objective lens 40, there is no danger of contact. Since the operation is just selecting the block field of view to the computer 18, observation field can be moved with an extremely simple operation. As a result, convenience of a user is greatly improved.

Since only the tilt mirror 28 is moved upon moving the observation field of view, there is no possibility to have an influence such as vibration on the sample 50, so that there is no possibility to vary the state of the sample 50. Since just tilting the tilt mirror 28, the observation field of view can be moved with a high speed. Furthermore, by quantitatively controlling the tilt mirror 28, the positional state of the tilt mirror 28 upon selecting the same block field of view can be the same regardless of the number of moving times of the observation field of view.

Accordingly, when the same block field of view is selected, the same observation picture of the previous observation can be displayed with high reproducibility without producing a positional gap of the tilt mirror 28. In this case, since the table data defining the tilt angle of the tilt mirror 28 is corrected with respect to the above-mentioned distortion, the observation can always be carried out by moving on a rectangular area on the sample 50.

When observation magnification is changed without tilting the tilt mirror 28, the center of the observation field of view with low magnification corresponds with that with high magnification. By using this function, a plurality of positions to be observed are registered with their coordinates as the center of the observation field of view in low magnification in advance, and the coordinates of each point are designated in turn after changing to high magnification, so that effective observation can be carried out.

In the first embodiment of the present invention, it is explained an example in which observation field of view is moved stepwise with each block field of view. However, the present invention is not limited to this embodiment. By operating such as a lever connected to the computer 18, the observation field of view may be moved continuously in the direction that the lever is inclined. Alternatively, the observation field of view may be moved stepwise with superposing half block field of view. This is the same as the third embodiment explained later.

It is explained an example that when the tilt mirror is tilted around the X axis, the field of view is moved only upward or downward, and when the tilt mirror is tilted around the Y axis, the field of view is moved only right or left, and vice versa. Alternatively, when the mirror is tilted around either X axis or Y axis, the field of view may be set to move both upward or downward and right or left. In this case also, when the table data such as the one described above has been prepared in advance, the observation field of view can be moved to any position.

The method to derive the tilt angle of the tilt mirror 28 by the computer 18 need not to use the above-described table data. For example, the tilt angle of the tilt mirror 28 may be derived from a conversion expression.

In order to simplify the explanation, although an example is explained that the position of the intersection of the axes of the tilt mirror 28 is fixed, another example may be possible that the position of the intersection of the axes of the tilt mirror 28 is moved.

In order to simplify the explanation, although the observation field of view is not moved by the tilt mirror 28 upon observing with low magnification, it may be moved.

In the first embodiment, it is explained an example that the mirror (the tilt mirror 28) locating to the objective lens 40 side is tilted and the mirror (mirror 58) locating to the observer side is fixed. The present invention is not limited to this embodiment. The observation field of view may be moved by tilting the mirror locating to the observer side with fixing the mirror locating to the objective lens side.

Second Embodiment

Figure 6:
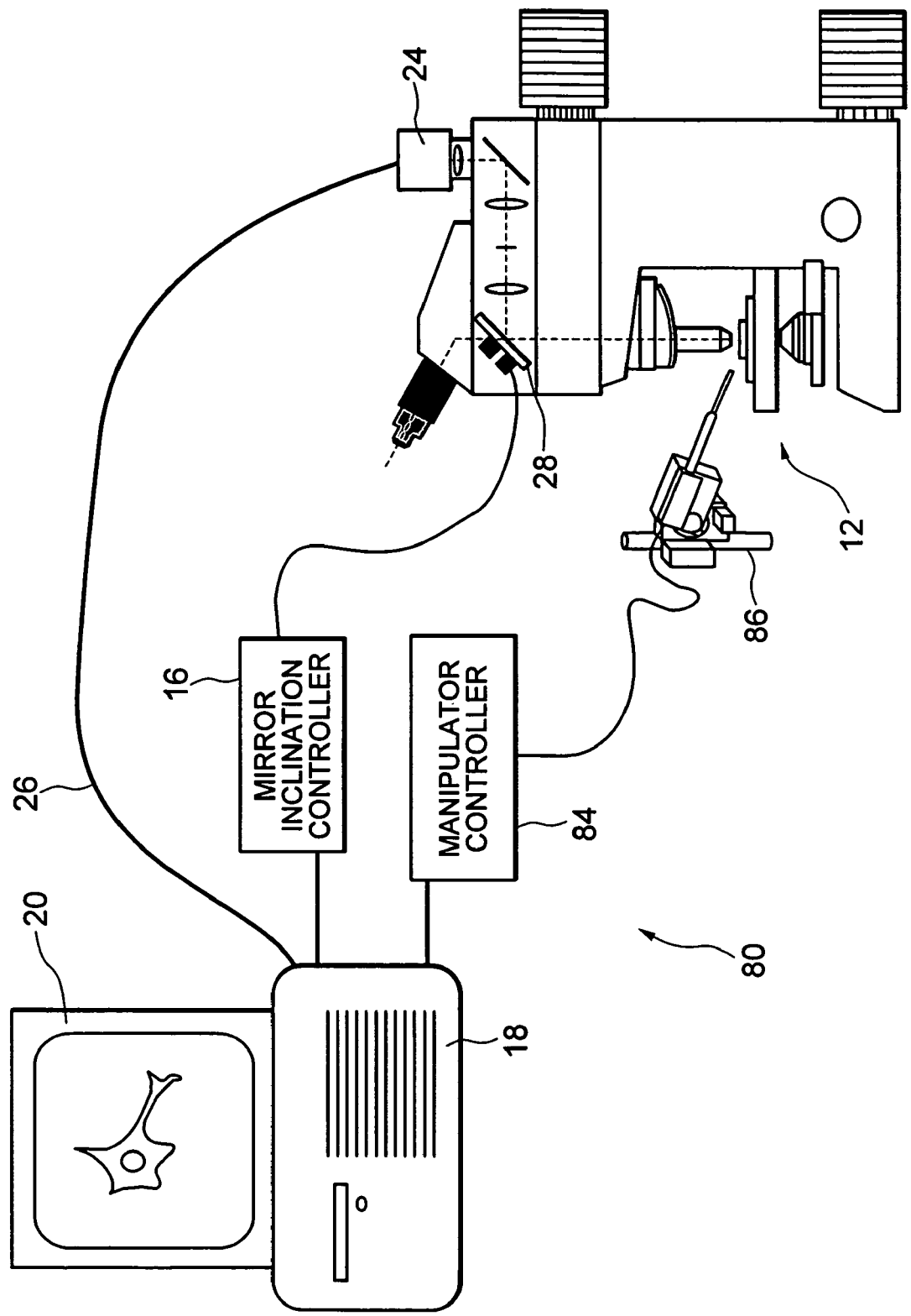
FIG. 6 is a schematic diagram showing a microscope system according to a second embodiment of the present invention.

FIG. 6 is a schematic diagram showing a microscope system according to a second embodiment of the present invention. As shown in FIG. 6, a microscope system 80 according to the second embodiment includes a manipulator controller 84 and a micromanipulator 86 in addition to the elements of the microscope system 10 according to the first embodiment. The difference between the first embodiment and the second embodiment is that movement of the observation field of view is associated with movement of the micromanipulator 86 such that when the observation field of view is moved to the right, an electrode needle of the micromanipulator 86 is also moved to the right.

The difference between the second embodiment and the first embodiment is specifically explained below. For example, the instruction that the observation field of view is moved in association with the micromanipulator 86 is assumed to be input to the computer 18. In this case, when the instruction to move the observation field of view is input to the computer 18, the computer 18 instructs the inclination controller 16 to tilt the tilt mirror 28 as same as the first embodiment.

Synchronizing with this movement, on the basis of the tilt angle of the tilt mirror 28, the computer 18 derives whether in which direction and by which amount the observation field of view moves on the sample 50, in other words, the moving amount and the moving direction of the observation field of view on the sample 50. Then, the computer 18 instructs the manipulator controller 84 to change the position of the micromanipulator 86 in accordance with the derived moving direction and moving amount.

As described above, the second embodiment makes it possible to automatically synchronize the position of the micromanipulator 86 to the observation field of view upon moving the observation field of view. Accordingly, the operational burden to a user can be lightened relative to the case that movement of the observation field of view and the operation of the micromanipulator 86 are carried out separately. Moreover, the micromanipulator 86 can be operated with moving the observation field of view. Furthermore, a plurality of micromanipulators 86 are set to the sample 50, the movement of the observation field of view can be synchronized with the positions of the plurality of micromanipulators 86. In the second embodiment also, since a mechanically moving element is only the tilt mirror 28, the similar effect as the first embodiment can be obtained.

Third Embodiment

Figure 7:
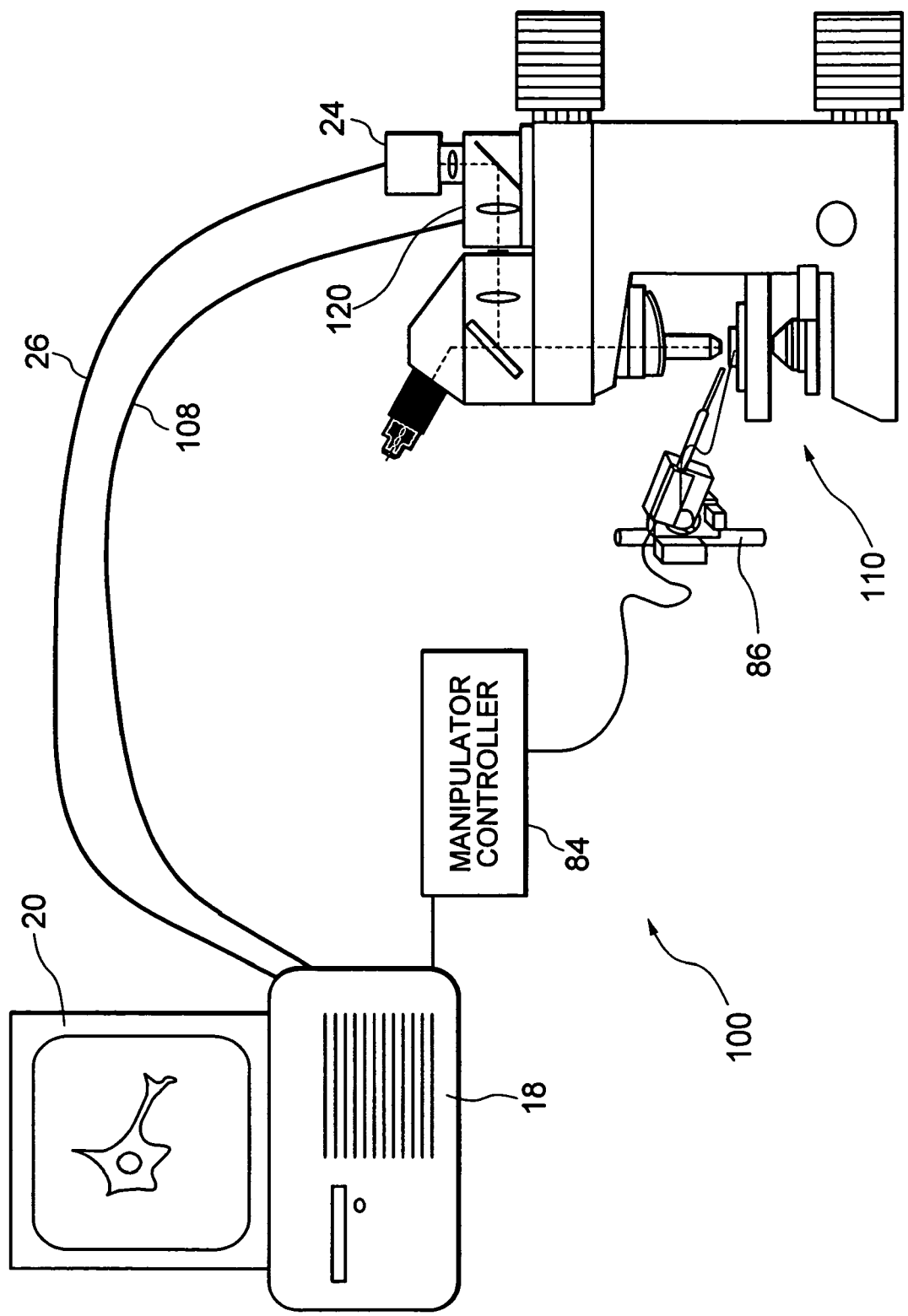
FIG. 7 is a schematic diagram showing a microscope system according to a third embodiment of the present invention.

FIG. 7 is a schematic diagram showing a microscope system according to a third embodiment of the present invention. As shown in FIG. 7, a microscope system 100 includes the monitor 20, the computer 18, the cable 26, a cable 108, the manipulator controller 84, the micromanipulator 86, and a microscope 110 according to the third embodiment.

Figure 8:
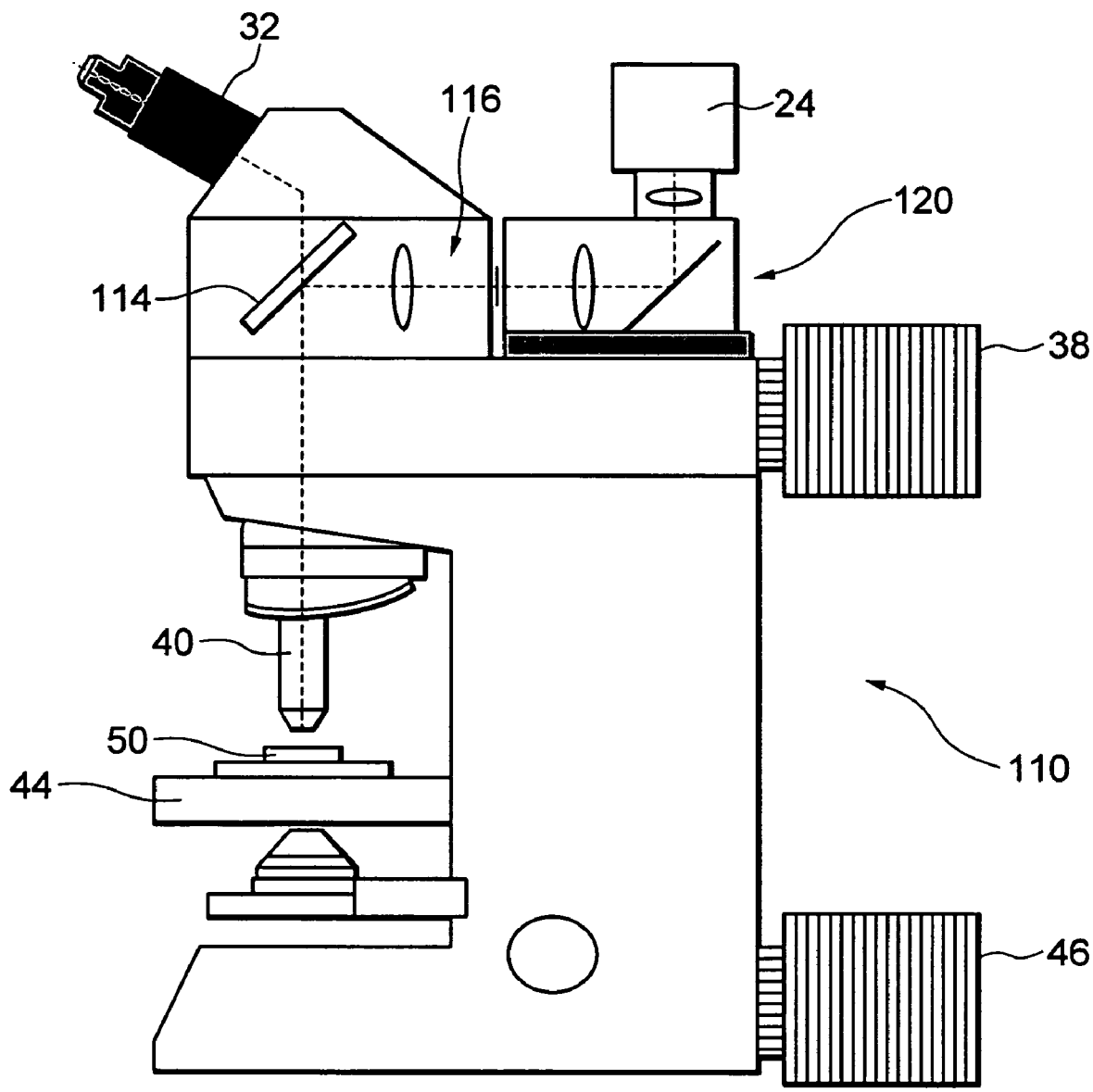
FIG. 8 is a schematic diagram showing the microscope of FIG. 7 in detail.

FIG. 8 is a schematic diagram showing the microscope 110 of FIG. 7 in detail. As shown in FIG. 8, the microscope 110 includes the eyepiece portion 32, a fixed mirror 114, a fixed optical system 116, a moving optical system 120 (including the camera 24), the fluorescence excitation light source 38, the objective lens 40, the stage 44, and the transmitted illumination light source 46.

The difference between the third embodiment and the second embodiment is a mechanism for moving the observation field of view in the microscope 110. In the third embodiment, the observation field of view is moved by moving the moving optical system 120. Moreover, in the third embodiment, the inclination or the position of the fixed mirror 114 locating on the optical axis of the objective lens 40 is not changed. The fixed mirror 114 is a semi-transparent mirror or a dichroic mirror.

Figure 9:
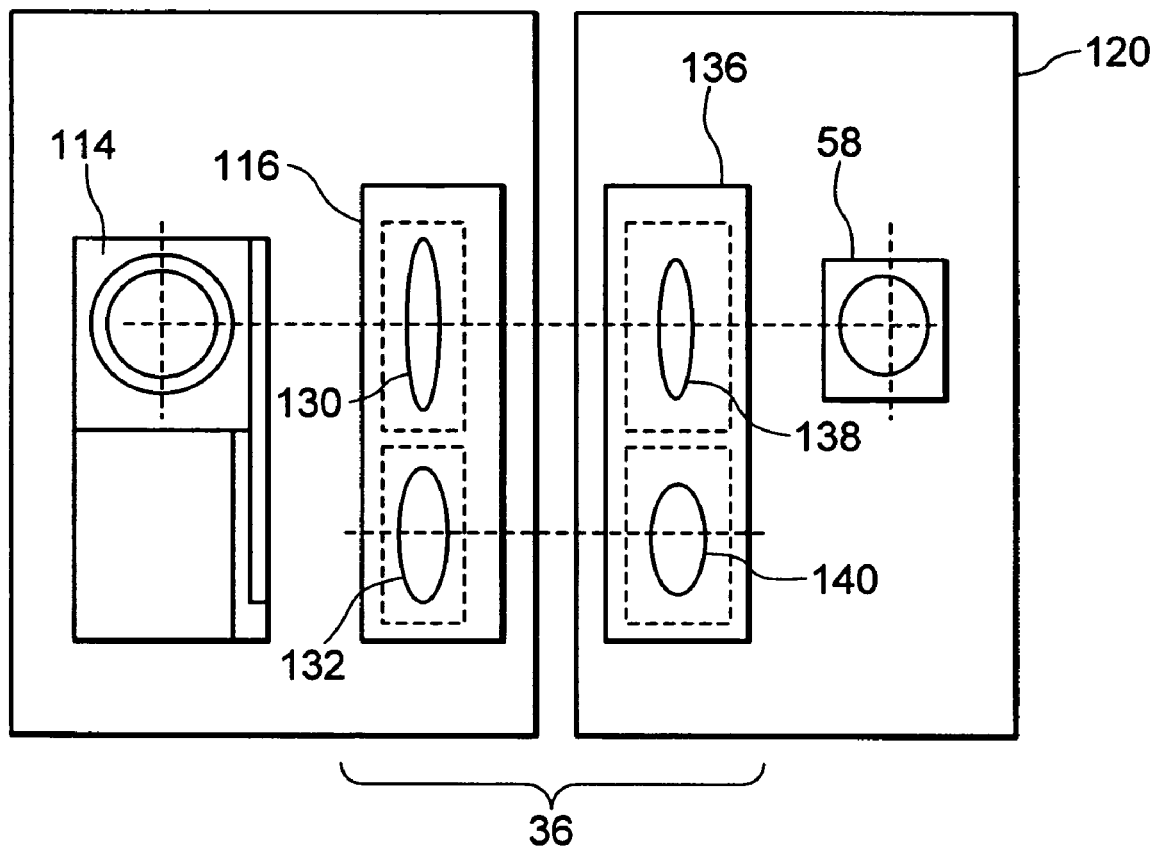
FIG. 9 is a schematic plan view of a fixed optical system 116 and a moving optical system 120 shown in FIG. 8 in detail seen along the optical axis of the objective lens shown in FIG. 8 in the direction from an eyepiece portion to a sample.
Figure 10:
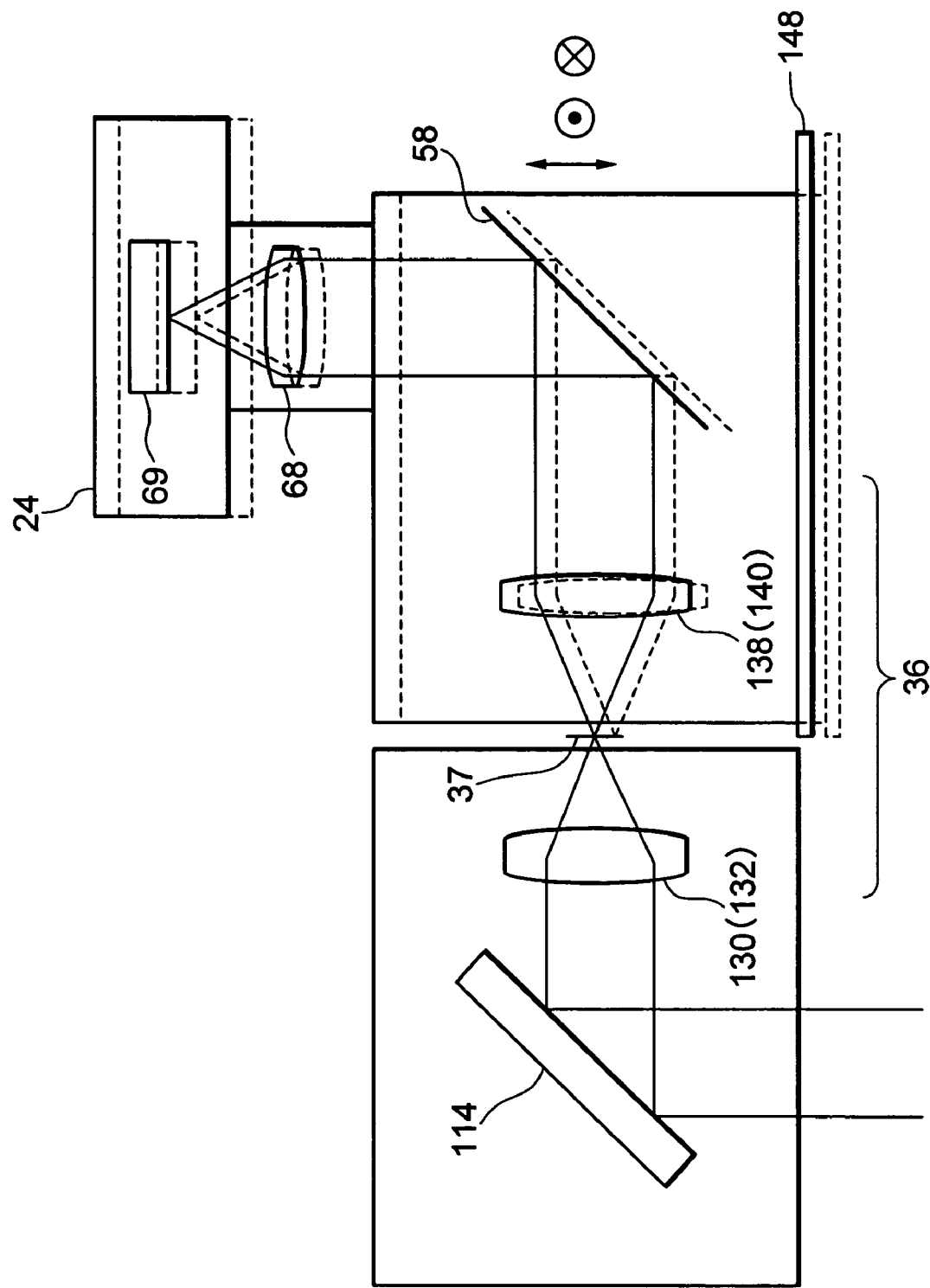
FIG. 10 is a diagram explaining the optical path of a bundle of light come out from the objective lens forming an image in a camera through the variable magnification optical system according to the third embodiment.

FIG. 9 is a schematic plan view of the fixed optical system 116 and the moving optical system 120 shown in FIG. 8 in detail seen along the optical axis of the objective lens shown in FIG. 8 in the direction from the eyepiece portion 32 to the sample 50. As shown in FIG. 9, the fixed optical system 116 includes variable magnification lenses 130 and 132. The moving optical system 120 includes a relay optical system 136 and the mirror 58. The relay optical system includes a variable magnification lenses 138 and 140. As shown in FIG. 10 explained later, although the moving optical system 120 includes a moving mechanism 148, the imaging lens 68, and the camera 24, they are omitted in FIG. 9 to avoid complication.

In the third embodiment, the variable magnification optical system 36 is composed of the fixed optical system 116 and the relay optical system 136. In other words, the variable magnification optical system 36 is set to low magnification (for example, 0.35) by inserting the variable magnification lens 130 of the fixed optical system 116 and the variable magnification lens 138 of the relay optical system 136 into the optical path between the fixed mirror 114 and the mirror 58. The variable magnification optical system 36 is set to high magnification (for example, 4) by inserting the variable magnification lens 132 of the fixed optical system 116 and the variable magnification lens 140 of the relay optical system 136 into the optical path between the fixed mirror 114 and the mirror 58. The magnification of the microscope 110 is given by the product of the magnification of the variable magnification optical system 36 multiplied by that of the objective lens 40 and low magnification and high magnification can be changed automatically as shown in the first embodiment.

FIG. 10 is a diagram explaining the optical path of a bundle of light come out from the objective lens 40 forming an image in the camera 24 according to the third embodiment. The principle of moving the observation field of view in the microscope 100 is explained below with reference to FIG. 10.

The bundle of light from the sample 50 through the objective lens 40 is reflected by the fixed mirror 114 changing the optical path perpendicularly, and forms an intermediate image 37 after passing through the variable magnification lens 130 (or 132). Then, the bundle of light passes through the variable magnification lens 138 (or 140), is reflected by the mirror 58 changing the optical path perpendicularly, passes through the imaging lens 68, and forms an observing image on the detection surface of the imaging device 69. By the way, a field stop may be arranged in the vicinity of the intermediate image 37.

In the third embodiment, upon moving the observation field of view, the moving optical system 120 as a whole is moved perpendicularly to the optical axis of the variable magnification optical system 36. In other words, the relay optical system 136, the imaging lens 68, and the camera 24 are moved in a body, and each element of the moving optical system 120 is moved on the same plane. Since the movement is on the same plane, there are two moving directions, one is, for example, in the direction of the optical axis of the imaging lens 68. In this case, the other is in the direction perpendicular to both the optical axis of the imaging lens 68 and that of the variable magnification lens, in other words, in the direction perpendicular to the plane of FIG. 10.

For example, when the moving optical system 120 is moved downward along the optical axis of the imaging lens 68, the position of each element is shown by dotted line in FIG. 10. In this case, when a bundle of light forming the central part of the intermediate image 37 is incident to the variable magnification lens 138 (or 140) before moving, a bundle of light forming a part of the intermediate image 37 away from the center is incident to the variable magnification lens 138 (or 140) after moving. This is equivalent to the case that the stage 44 on which the sample 50 is placed is moved perpendicularly to the optical axis of the objective lens 40. Accordingly, in the third embodiment also, the observation field of view can be moved without changing positional relation between the objective lens 40 and the sample 50.

Then, the procedure of moving the observation field of view is explained. In order to simplify the explanation as same as the first embodiment, it is explained the case that after searching for a position to be observed with low magnification observation, by changing the variable magnification optical system to high magnification, the enlarged position is observed with moving the moving optical system 120.

As same as the first embodiment, the instruction to move the observation field of view is carried out, for example, by selecting the block field of view with inputting from the keyboard of the computer 18. The computer 18 stores "the table data that defines the each moving amount of the moving optical system 120 in the above-described two directions in order to move the observation field of view to each block field of view".

When a block field of view is selected, the computer 18 derives the moving amount of the moving optical system 120 in the above-described two directions on the basis of the table data. The moving mechanism 148 is connected to the computer 18 through the cable 108. The computer 18 controls the moving mechanism 148 to move the moving optical system 120 in accordance with the derived moving amount, and moves the observation field of view. Then, the variable magnification optical system 36 may be changed to high magnification.

In the third embodiment also, the same effect as the first and second embodiments can be obtained. By the way, in the third embodiment, an example is explained that the microscope system 100 includes the manipulator controller 84 and the micromanipulator 86. Although duplicated explanation is omitted, an example is explained that movement of the observation field of view and movement of the micromanipulator 86 are synchronized. However, the present invention is not limited to the embodiment. As same as the first embodiment, the construction may not include the manipulator controller 84 or the micromanipulator 86.

In order to simplify the explanation, although the observation field of view is not moved by the moving optical system 120 upon observing with low magnification, it may be moved. The method to derive the moving amount of the moving optical system 120 by the computer 18 need not to use the above-described table data, and it may be derived from a conversion expression.

Fourth Embodiment

Figure 11:
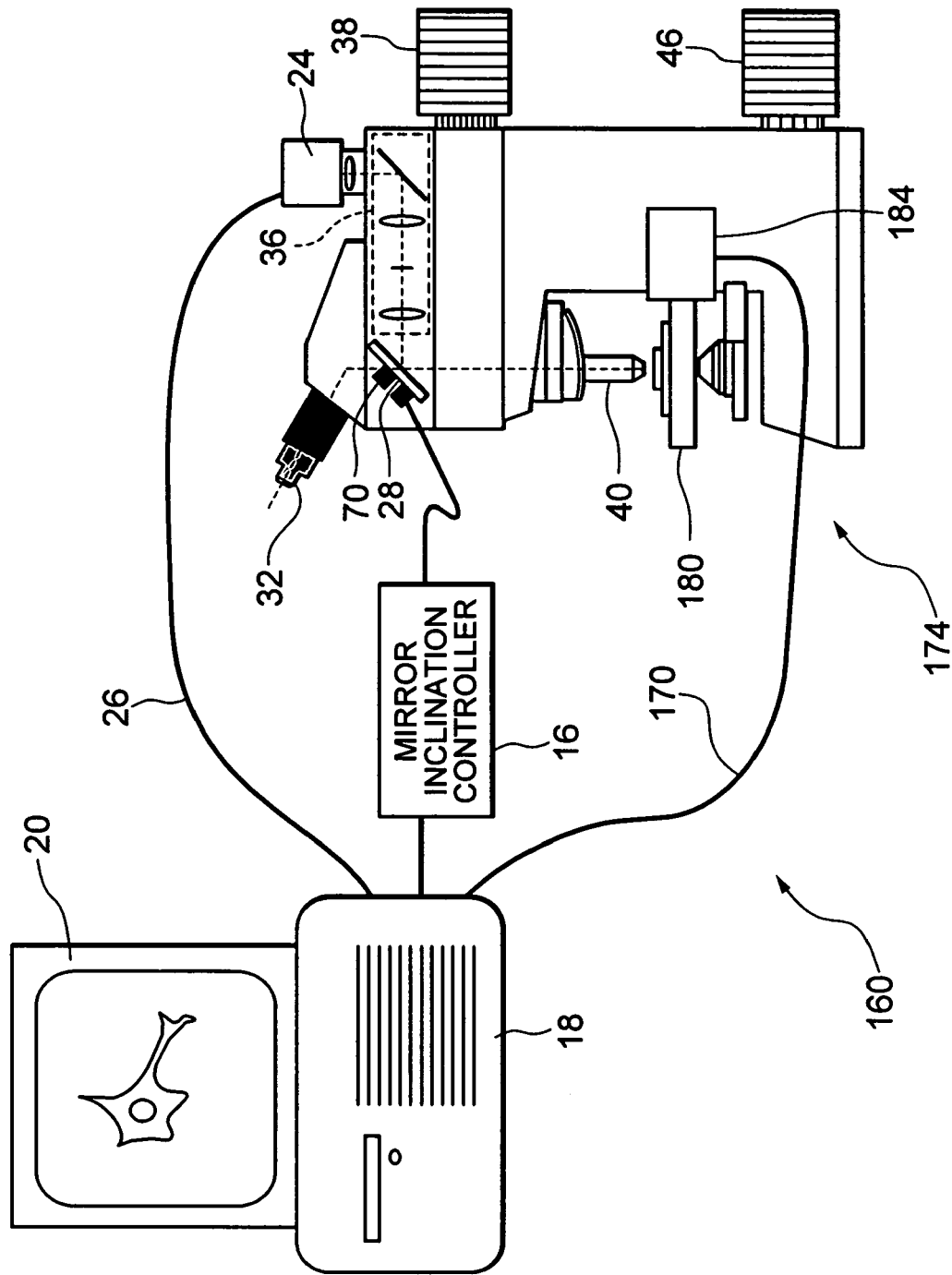
FIG. 11 is a schematic diagram showing a microscope system (a virtual slide forming system) according to a fourth embodiment of the present invention.

FIG. 11 is a schematic diagram showing a microscope system 160 according to a fourth embodiment of the present invention. As shown in FIG. 11, the microscope system 160 includes the monitor 20, the computer 18, the cable 26, a cable 170, the mirror inclination controller 16, and a microscope 174 according to the fourth embodiment.

The microscope 174 includes the fluorescence excitation light source 38, the camera 24, the variable magnification optical system 36, the eyepiece portion 32, the tilt mirror 28, the tilt controller 70, the objective lens 40, a large stage 180, a stage moving mechanism 184, and the transmitted illumination light source 46. The microscope 174 is the same as the microscope 12 according to the first embodiment except having the large stage 180 and the stage moving mechanism 184 instead of the stage 44. The stage moving mechanism 184 is connected to the computer 18 through the cable 170.

FIG. 12 is a perspective view showing a large stage 180 of the microscope 174 shown in FIG. 11 in detail. As shown in FIG. 12, a plurality of sample slides 190 are placed on the large stage 180.

In the fourth embodiment, the computer 18 tilts the tilt mirror 28 stepwise without moving the large stage 180 in a state where the variable magnification optical system 36 is set to high magnification. Accordingly, the computer 18 moves stepwise the sample area shown as the image (in other words, a position on the sample slide 190 whose image is formed on the imaging device 69 is moved stepwise). This is similar to the movement of the observation field of view according to the first embodiment. However, the purpose is not observation but to form virtual slides.

Then, the computer 18 obtains image data generated by the camera 24. The computer 18 displays a picture image from the obtained image data on the monitor 20 and stores the data in the memory.

The computer 18 repeatedly carries out the movements that tilts the tilt mirror 28 (moving the sample area), instructs the camera 24 to generate image data, and obtains and stores the image data. In this manner, the computer 18 connects the image data generated successively to form the whole image data of a single sample slide 190 (virtual slide). The computer 18 stores the generated virtual slide in such as a hard disk.

Then, the computer 18 controls the stage moving mechanism 184 to move the large stage 180 in the direction perpendicular to the optical axis of the objective lens 40 (for example, the direction indicated by an arrow shown in FIG. 12), and to locate another sample slide 190 directly under the optical axis of the objective lens 40. As described above, the computer 18 forms a virtual slide of the sample slide 190 and stores it in such as a hard disk. The above-described explanation is the operation of the fourth embodiment.

It frequently happens that a virtual slide is formed collectively to a large number of large sample slides (such as a 25 mm square), so that it is necessary to use a large stage in order to place these sample slides. Moreover, since high resolving power is required, it is necessary to photograph with high magnification, a high numerical aperture (such as 0.65 or more), and a large number of pixels (such as 2000 or more vertically, and 2500 or more horizontally). Accordingly, in order to form virtual slides quickly, it is necessary to move the stage or the objective lens a large number of times with high speed. In this case, it is highly possible that the sample is affected by the vibration and the like. Accordingly, the stage has not been possible so far to be moved with high speed upon forming virtual slides, so that it has been desired to make it possible.

Accordingly, in the fourth embodiment, the method according to the first embodiment is applied to forming virtual slides so that the movement of the sample area shown by the image is precisely controlled with high speed by the computer 18, the tilt mirror 28, and the like. As a result, the picture image composing each part of the virtual slides can precisely be photographed with high speed. Therefore, the above-described conventional problems can be solved, and the time to form the virtual slides can be shortened.

In the virtual slide, since the image data of the whole sample slides are formed by connecting each image data photographed with moving the field of view, it is necessary that direction of each image data is precisely aligned with each other. In order to satisfy the requirement, it is desirable that the tilt amount of the tilt mirror should be corrected to correct a minute amount of image rotation caused by the mirror (in this case, the tilt mirror 28). The correction is derived by such as experiments or simulation in advance, and may be shown in the table data.

In the fourth embodiment, it is explained an example that the movement of the sample area shown by the image is moved by tilting the tilt mirror 28 with adding the large stage 180 and the stage moving mechanism 184 to the microscope 12 according to the first embodiment. However, the present invention is not limited to the fourth embodiment. With adding the large stage 180 and the stage moving mechanism 184 to the microscope 110 according to the third embodiment, the similar operation may be carried out by moving the moving optical system 120. The movement and photographing of the sample area shown by the image may be carried out in the state that the variable magnification optical system 36 is set to low magnification. In this case, the resolving power of the formed virtual slide is lowered.

In the first through fourth embodiment, it is explained an example that the magnification of the variable magnification optical system 36 is changed by changing lenses. The present invention is not limited to the embodiment. By constructing the variable magnification optical system 36 by lens groups capable of zooming, the magnification of the variable magnification optical system 36 may be changed without changing the lens.

In the first through the third embodiment, although it is explained an example that an upright microscope is applied to the present invention, an inverted microscope may also be applied to the present invention.

All numerical values listed in the first through fourth embodiment are only an example for reference except those connected with the objective lens 40.

As described above, the present invention can considerably be used in the field of microscope (in particular, a microscope for electrophysiology or virtual slides).

Additional advantages and modification will readily occur to those skilled in the art. Therefore, the invention in its broader aspect is not limited to the specific details, and representative devices shown and described herein. Accordingly, various modifications may be made without departing from the spirit or scope of the general inventive concept as defined by the appended claims and their equivalents.

What is claimed is:

1. A microscope optical system comprising:
an objective lens to be located nearest to a sample, in an optical path between the sample and a camera;
a variable magnification optical system that forms an intermediate image conjugate with the sample, together with the objective lens, the variable magnification optical system having a low magnification state and a high magnification state;
a mirror having a reflecting surface disposed in the optical path between the objective lens and the variable magnification optical system so as to guide light from the sample along the optical path to the camera, the mirror being arranged to change position of the reflecting surface by tilting of the mirror about each of two axes so as to change a direction of the optical path;

a monitor that displays an image of the sample taken by the camera with the variable magnification optical system in the low magnification state with coordinates of a plurality of user-selectable fields of view superimposed therewith;

a mirror controller which stores a table of data for determining respective tilt amounts of the mirror associated with the coordinates of said user-selectable fields of view, the table of data including a list of coordinates of the user-selectable fields of view and respective amounts of tilt of the mirror, said table of data having been corrected for image distortion of the user-selected field of view due to an amount of tilt of the mirror; and a computer operatively connected to the mirror controller and the variable magnification optical system, wherein, when one of the user-selectable fields of view is selected by the user, the computer determines an amount of mirror tilt needed to move from a current field of view to the user-selected field of view, without moving the sample, according to said table of data and instructs the mirror controller to tilt the mirror by the determined amount of mirror tilt, and the computer instructs the variable magnification system to change to the high magnification state such that the monitor displays a magnified image of the user-selected field of view when tilting of the mirror is completed.

2. The microscope optical system according to claim 1, wherein the computer instructs the variable magnification system to change to the high magnification state when tilting of the mirror is completed.

3. A microscope optical system comprising:

an objective lens to be located nearest to a sample, in an optical path between the sample and an image to be observed;

a variable magnification optical system that forms an intermediate image conjugate with the sample, together with the objective lens;

a mirror having a reflecting surface disposed in the optical path between the objective lens and the variable magnification optical system so as to guide light from the sample along the optical path to a camera, the mirror being arranged to change position of the reflecting surface by tilting of the mirror about each of two axes perpendicular to each other without changing the position of the sample so as to change a direction of the optical path;

a monitor that displays the image to be observed with coordinates of observation fields of view superimposed therewith; and a mirror controller which controls the tilting of the mirror, wherein said mirror controller has information relating positions of the observation fields of view for viewing the sample to respective amounts of tilt of the mirror, and controls tilting of the mirror based on said information, said information including a table of control data, which has been corrected for image distortion of the observation field of view due to an amount of tilt of the mirror, for determining the respective tilt amounts of the mirror.

4. The microscope optical system according to claim 3, further including:

a computer; and a lever connected to the computer, wherein a direction of inclination of the lever is used to control tilting of the mirror so as to change an observation field of view.

5. The microscope optical system according to claim 3, wherein the table of control data includes a list of coordinates of the observation fields of view and respective amounts of tilt of the mirror.

6. The microscope optical system according to claim 3, wherein the mirror is tiltable stepwise every blockfield of view or continuously.

* * * * *

UNITED STATES PATENT AND TRADEMARK OFFICE
CERTIFICATE OF CORRECTION

| | |
|---|---|
| PATENT NO. | : 7,630,113 B2 |
| APPLICATION NO. | : 11/121961 |
| DATED | : December 8, 2009 |
| INVENTOR(S) | : Ichiro Sase |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 137 days.

Signed and Sealed this

Twelfth Day of October, 2010

David J. Kappos
*Director of the United States Patent and Trademark Office*